US005634273A

United States Patent [19]

Michels et al.

[11] Patent Number: 5,634,273

[45] Date of Patent: Jun. 3, 1997

[54] GUIDE BAR HAVING AN OIL-FEED CHANNEL

[75] Inventors: Winfried Michels, Aichwald; Jochen Buchholtz, Waiblingen, both of Germany

[73] Assignee: Andreas Stihl, Waiblingen, Germany

[21] Appl. No.: 607,129

[22] Filed: Feb. 26, 1996

[30] Foreign Application Priority Data

| | | | |
|---|---|---|---|
| Feb. 28, 1995 | [DE] | Germany | 195 06 829.7 |
| Dec. 19, 1995 | [DE] | Germany | 195 47 353.1 |

[51] Int. Cl.[6] ........ B23D 59/04

[52] U.S. Cl. ........ 30/123.4; 30/383

[58] Field of Search ........ 30/123.4, 383, 30/387

[56] References Cited

U.S. PATENT DOCUMENTS

| | | | |
|---|---|---|---|
| 2,913,020 | 11/1959 | Nielsen | 30/123.4 |
| 3,578,779 | 5/1971 | Ishizaki | 30/123.4 |
| 3,581,783 | 6/1971 | Sandin | 30/123.4 |
| 4,693,005 | 9/1987 | Wehle et al. | 30/383 |
| 5,035,058 | 7/1991 | Date et al. | 30/387 |
| 5,050,303 | 9/1991 | Sinclair et al. | 30/123.4 |

FOREIGN PATENT DOCUMENTS

| | | | |
|---|---|---|---|
| 908296 | 2/1954 | Germany | 30/123.4 |

*Primary Examiner*—Hwei-Siu Payer
*Attorney, Agent, or Firm*—Walter Ottesen

[57] ABSTRACT

The invention relates to a guide bar (9) for a saw chain (10) having a sword-shaped base body (16). A peripheral guide groove (11) is introduced into the periphery (17) of the base body (16). an oil-feed channel (22) is provided which opens into the guide groove (11) in the region of the groove bottom (23) and is fed from a transverse channel (21) lying below the groove bottom (23). The inlet opening (20) of the transverse channel (21) is at an outer side (9.1, 9.2) of the base body (16). The position, shape and size of the oil-feed channel (22) as well as the transverse channel (21) can be freely configured. This is achieved by arranging the transverse channel (21) in an insert part (25) separate from the base body (16). The insert part has the oil-feed channel (22). The insert part (25) is mounted in an open cutout (24) of the base body (16). The cutout (24) is open to an outer side (9.1, 9.2) of the base body (16) and extends substantially below the groove bottom (23).

19 Claims, 8 Drawing Sheets

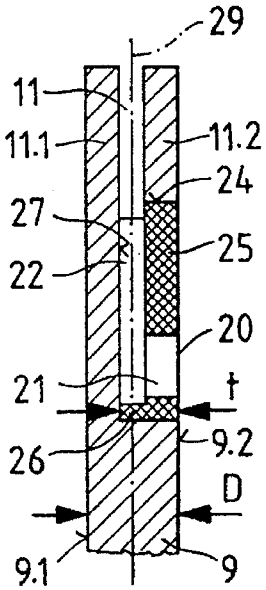
Fig.10
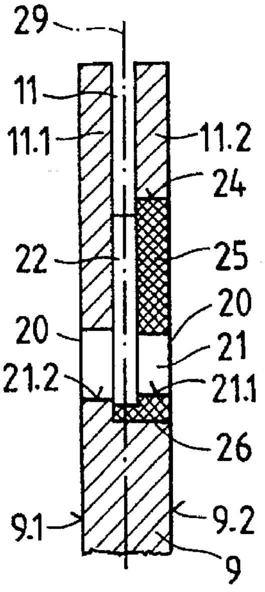
Fig.10a
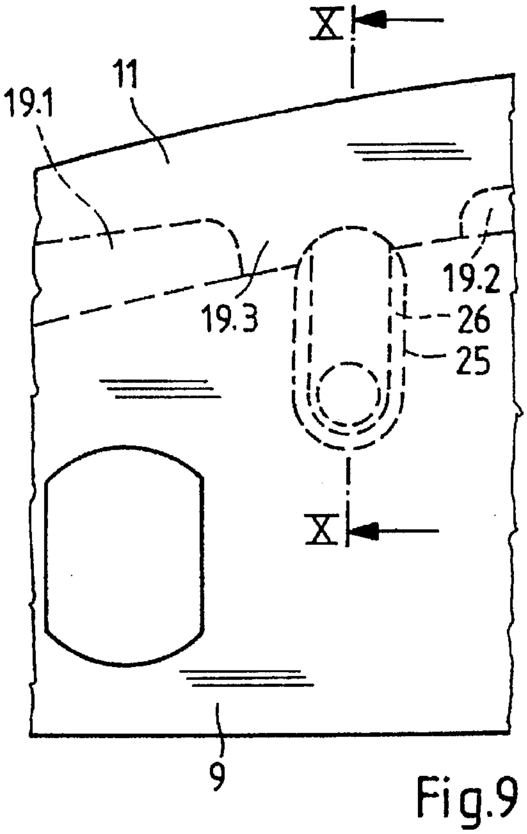
Fig.9
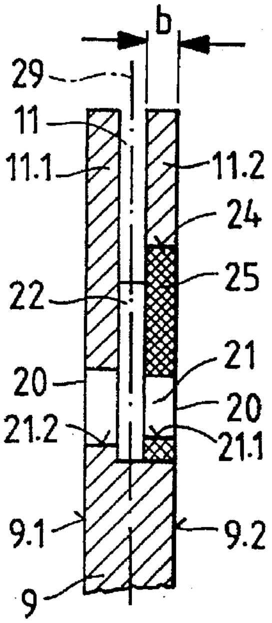
Fig.12
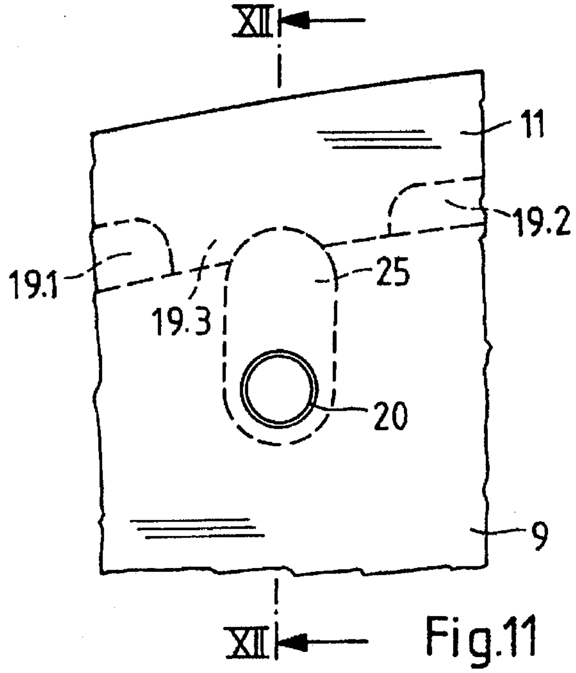
XII Fig.11

GUIDE BAR HAVING AN OIL-FEED CHANNEL

FIELD OF THE INVENTION

The invention relates to a guide bar for a saw chain and has a sword-shaped base body defining a peripheral surface. A guide groove is formed in the peripheral surface to guide the saw chain in its movement about the guide bar. An oil-feed channel opens into the guide groove in the region of the groove bottom.

BACKGROUND OF THE INVENTION

Such a guide bar is clamped to a portable handheld motor-driven chain saw and is clamped between the sprocket wheel cover and the motor housing. The guide bar can be mounted to a tree harvesting machine, a so-called harvester machine, by means of a clamping plate.

Lubricating oil is introduced into the guide groove formed in the periphery of the guide bar for the saw chain. The lubricating oil enters via an oil-feed channel opening into the guide groove in the region of the groove bottom. The oil-feed channel is fed from a transverse channel lying below the groove bottom. This transverse channel has at least one entry opening on an outer side of the guide bar.

The configuration of the oil-feed channel as well as the transverse channel is costly with respect to both time and work especially for those guide bars made of solid material. Because the material of the guide bar is hardened, special drilling tools or special methods, such as eroding or laser techniques or the like, are necessary for making the channels. The transverse channel is relatively simple to make as a through bore extending perpendicularly to the guide bar. However, introducing the oil-feed channel is hindered because of the width of the guide groove. Accordingly, the oil-feed channel cannot be greater in diameter than the width of the guide groove because it must be bored or eroded from the periphery parallel to the plane of the guide bar. If the oil-feed channel would be configured to have a diameter greater than the width of the guide groove, then the guide flanges of the guide groove would also be eroded or removed because the tool runs up against the inner side of the guide flanges. Even partially abrading the guide groove to a greater depth is unsatisfactory since the strength of the guide flanges is reduced thereby. The introduction of the oil channels is greatly limited by the configuration of the oil channels as well as by the position thereof.

SUMMARY OF THE INVENTION

It is an object of the invention to configure a guide bar in such a manner that the oil channels to be provided can be substantially freely selected with respect to position, form and size and yet be easy to manufacture.

The guide bar of the invention is for guiding a saw chain. The guide bar includes: a sword-shaped base body having a peripheral edge defining a peripherally-extending guide groove for guiding the saw chain in its movement around the guide bar; the guide groove having a groove bottom; the base body having first and second lateral sides and a cutout formed therein; the cutout being formed in the base body so as to be open at least at one of the lateral sides and so as to extend essentially below the groove bottom; an insert part separate from the base body seated in the cutout; the insert body having a transverse channel formed therein through which oil is supplied and the transverse channel being disposed below the groove bottom; and, the insert body delimiting an oil-feed channel extending from the transverse channel and opening into the guide groove in the region of the groove bottom whereby the oil passes from the transverse channel to the guide groove through the oil-feed channel.

With the arrangement of the insert part, an otherwise unattainable freedom of configuration is obtained with respect to the position, the form and the size of the oil-feed channel as well as also the feeding transverse channel. The machining complexity for an appropriate cutout in the guide bar and the complexity of assembly of the insert part in a corresponding cutout are minimal.

The cutout can be configured as a breakthrough or also as a recess or a portion which has been ground out. The insert part is, in each case, selected to have an appropriate thickness. If the thickness of the insert part is greater than the depth of the cutout, then the insert part is pressed perpendicularly to the guide bar when the end of the guide bar having the insert part is clamped between the support and the clamping plate. In this way, a tight connection of the transverse channel to the oil-feed channel of a lubricating pump of the drive unit is obtained in the plane of contact. Preferably, the oil-feed channel is formed in the insert part itself. The diameter of the oil-feed channel can then be configured to be greater than the width of the guide groove.

The pump action can be effected in a targeted manner with a change of the cross section in the flow direction of the oil-feed channel. The oil-feed channel can be inclined in the direction of the movement of the saw chain.

In a special embodiment of the invention, the cutout is configured to have an undercut in at least one of the side surfaces into which the insert part can be pressed. The insert part is provided with a raised portion which engages into the undercut. The insert part is preferably made of plastic. In this way, a form-tight interdigital engagement is guaranteed whereby the insert part is held so that it cannot become separated.

It can be adequate to configure the insert part with a slightly greater dimension than the cutout so that the insert part can be held force-tight in the cutout. Preferably, an undercut as well as an oversize is provided.

The insert part is purposefully made as one piece with fill bodies arranged in the guide groove. In this way, the fill bodies delimit a retaining space lying in the region of the output opening of the oil-feed channel.

Preferably, the insert part is made of a material different from that of the base body. The insert part can especially be a plastic part made of an elastomer, a silicone mixture or rubber. A metal die cast part made of aluminum or like material is also purposeful. In this way, the corresponding channels are formed at the same time that the insert part is produced.

BRIEF DESCRIPTION OF THE DRAWINGS

The invention will now be described with reference to the drawings wherein:

FIG. 9 is an enlarged detail view of a closure-cover like insert part for a recess formed in the guide bar;

FIG. 10 is a section view taken along line X—X of FIG. 9;

FIG. 10*a* is a section view corresponding to FIG. 10 with a transverse channel for supplying oil with the transverse channel extended in the base body;

FIG. 11 is an enlarged detail view of a closure cover like insert part of another embodiment;

FIG. 12 is a section view taken along line XII—XII of FIG. 11;

DESCRIPTION OF THE PREFERRED EMBODIMENTS OF THE INVENTION

Figure 1:
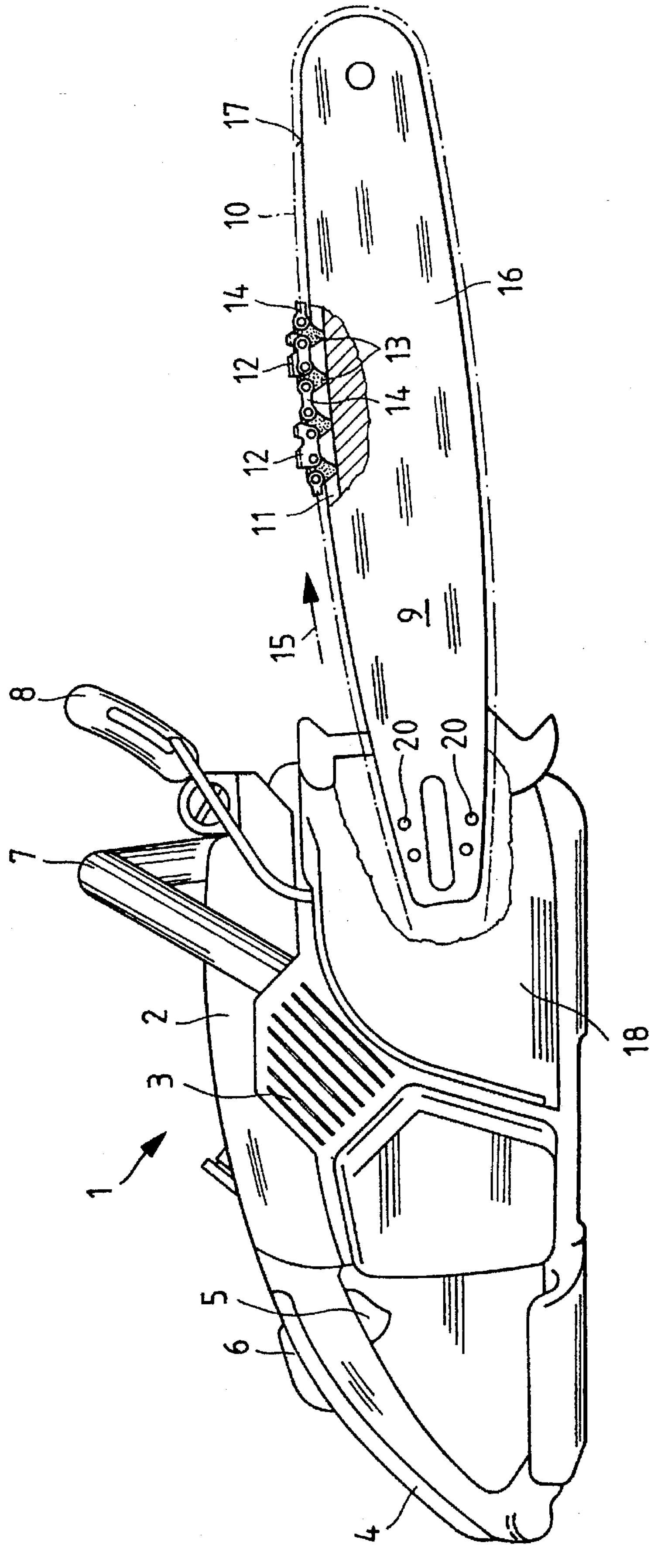
FIG. 1 is a schematic view, partially in section, of a motor-driven chain saw having a guide bar according to the invention.

The guide bar 9 of the invention for a saw chain 10 is mounted on a motor-driven chain saw 1 in the embodiment shown. A guide bar of this type is mostly provided on a tree-harvesting machine (a so-called harvester machine). A clamping end of the guide bar is mounted with a clamping plate on a support of the machine. The guide bar comprises a sword-shaped base body 16 having a periphery 17 in which a peripheral groove 11 is introduced for guiding the saw chain 10. The peripheral surfaces (17.1, 17.2) shown in FIG. 3 remain at the two sides of the guide groove 11 and define guide surfaces for the side cutting links 12 and side connecting links 14 of the saw chain 10. The drive links 13 connect the cutting links 12 and the connecting links 14 and have rakers projecting into the guide groove 11. The drive links 13 coact with a sprocket wheel driven by an internal combustion engine 3 in order to drive the saw chain 10 in the running direction 15.

The motor-driven chain saw 1 shown as an example is held by an operator at a rearward handle 4 aligned in the longitudinal direction of the guide bar 9 and a forward handle 7 extending transversely above the engine housing 2. The throttle lever 5 and a throttle lever lock 6 corresponding thereto are mounted in the rearward handle 4. A guard lever 8 is provided between the forward handle 7 and the guide bar 9. The guard lever 8 is at the same time a trigger for a safety braking device for bringing the saw chain 10 to standstill.

The end of the guide bar 9 facing toward the motor-driven chain saw 1 is tightly clamped in the embodiment between a sprocket wheel cover 18 and the engine housing 2. Oil-inlet openings 20 are provided in the base body 16 of the guide bar 9 in the region of the clamping end. The oil-inlet openings 20 are formed by a transverse channel 21 (FIG. 3) arranged in the guide bar 9. The transverse channel 21 communicates with an oil-feed channel 22 which opens into the guide groove 11. The oil-feed channel 22 preferably branches approximately at right angles from the transverse channel 21 and runs especially perpendicularly to the groove bottom 23 of the guide groove 11.

An oil pump (not shown) pumps lubricating means into the guide groove 11 via the oil-inlet opening 20, the transverse channel 21 and the oil-feed channel 22. The lubricating means is taken along by the rakers of the drive links 13 and is distributed over the chain itself because of centrifugal force when the saw chain is running in the peripheral direction 15 and lubricates the connecting joints of the saw chain as well as the guide surfaces (17.1, 17.2) on the guide flanges (11.1, 11.2) of the guide groove 11. Wear is reduced and excellent quiet running is obtained because of the lubrication of the saw chain and the running surfaces on the guide bar 9.

Figure 2:
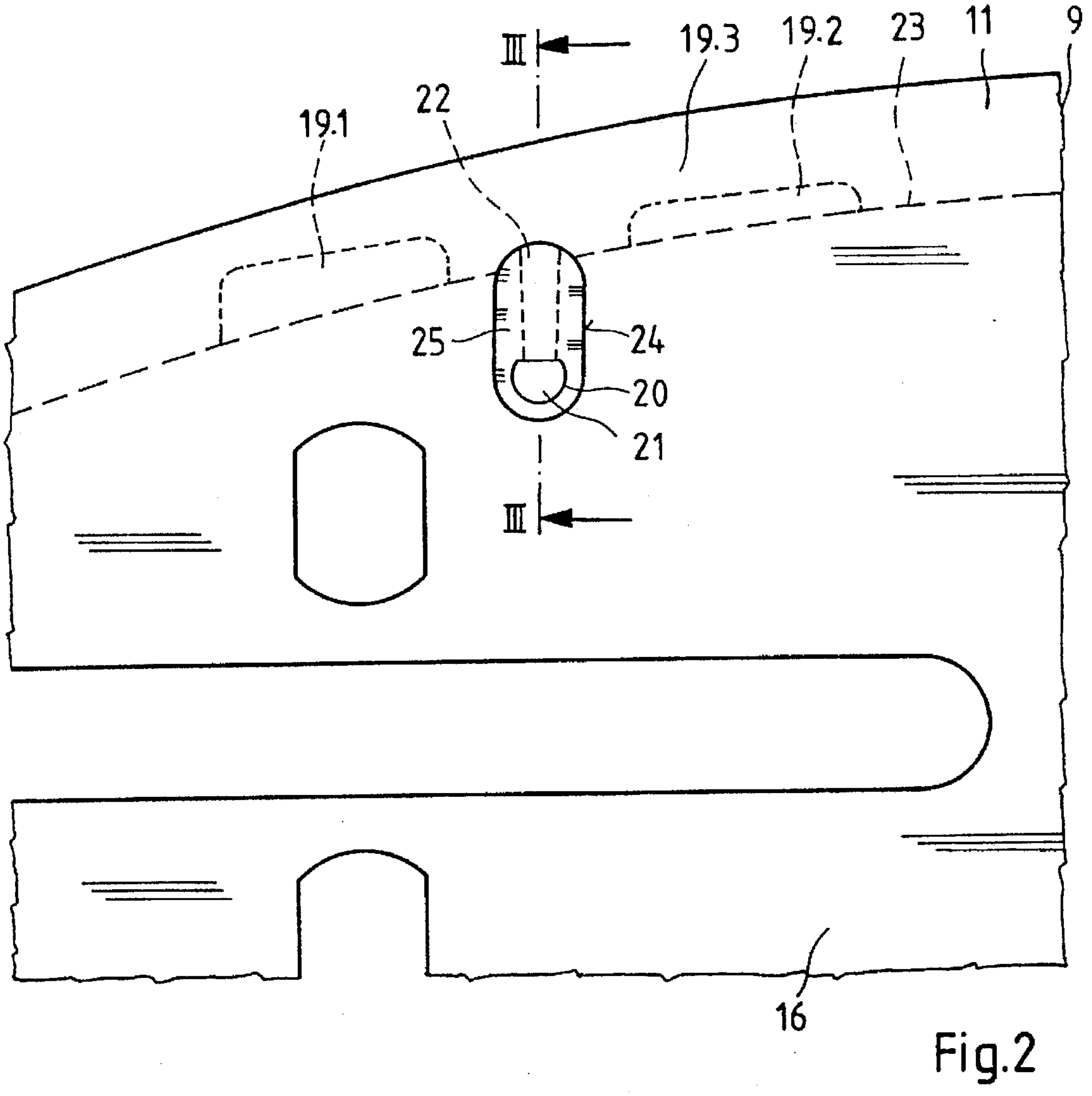
FIG. 2 is an enlarged detail view of the guide bar of FIG. 1 with a mounted insert part.
Figure 3:
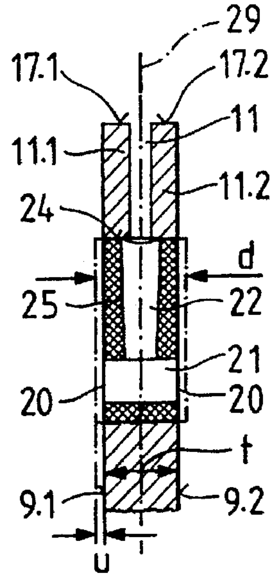
FIG. 3 is a section view taken along line III—III of FIG. 2.

As shown in FIGS. 2 and 3, the transverse channel 21 and the oil-feed channel 22 are provided in an insert part 25 configured separately from the base body 16 of the guide bar 9. The insert part 25 is seated in a corresponding cutout 24 of the guide bar 9. The cutout 24 can be configured as a breakthrough (FIG. 3) which is open to both outer sides (9.1, 9.2) of the guide bar 9.

Referring to FIG. 2, the cutout 24 extends essentially below the groove bottom 23 of the guide groove 11 and is open to the guide groove. The thickness (d) of the insert part 25 corresponds essentially to the depth (t) of the cutout 24. The thickness (d) is preferably slightly greater than the depth (t) of the cutout 24 whereby a projecting amount (u) of the insert part 25 results at both outer sides (9.1, 9.2) of the guide bar 9. The breakout is cut out especially by means of a laser.

The insert part 25 is made of another material than the guide bar 9 comprising especially a solid material. The insert part 25 preferably is a plastic part (elastomer, silicone mixture, rubber) or a metal die cast part (aluminum, magnesium). Because of the projecting amount (u), the insert part 25 is swaged when the rearward end of the guide bar is clamped between a support (for example, the engine housing 2) and a clamping plate (such as the sprocket wheel cover 18). This causes the insert part 25 to provide a liquid-tight seal. A seal-tight connection of the oil-inlet opening 20 to the lubricating oil supply is ensured.

The insert part 25 is preferably provided with exterior dimensions which exceed those of the cutout 24 so that the insert part 25 is swaged when pressed into the cutout 24 in the plane of the guide bar 9. In this way, a tight, non-separable seat of the insert part 25 is provided in the cutout 24 of the guide bar 9.

As shown in FIG. 2, the cutout 24 extends into the guide groove 11 so that the oil-feed channel 22 formed in the insert part 25 opens directly into the guide groove 11 and preferably above the groove bottom 23. For this purpose, the insert part 25 preferably projects into the guide groove 11. In the longitudinal direction of the guide groove 11, filler bodies (19.1, 19.2) are provided in the guide groove 11 forward and rearward of the insert part 25 in order to retain the lubricating oil, which exits into the guide groove 11, in the region of the outlet opening of the oil-feed channel 22. The filler bodies delimit a retaining space 19.3 in which the oil-feed channel 22 opens. The oil-feed channel 22 expands in a slightly funnel-like shape in the direction toward its opening. This funnel-like shape is preferably conical.

The form of the insert part 25 corresponds to the cutout 24 itself. In the embodiments of FIGS. 2 to 5, the transverse channel 21 formed in the insert part 25 is open to both outer sides (9.1, 9.2) of the guide bar 9. The cross section of the oil-feed channel 22 corresponds approximately to a flattened circle. Preferably, the insert part 25 is configured symmetrically to a longitudinal center plane 29 of the guide bar 9. A configuration unsymmetrical to this plane can be purposeful (FIGS. 9 to 12).

Figure 4:
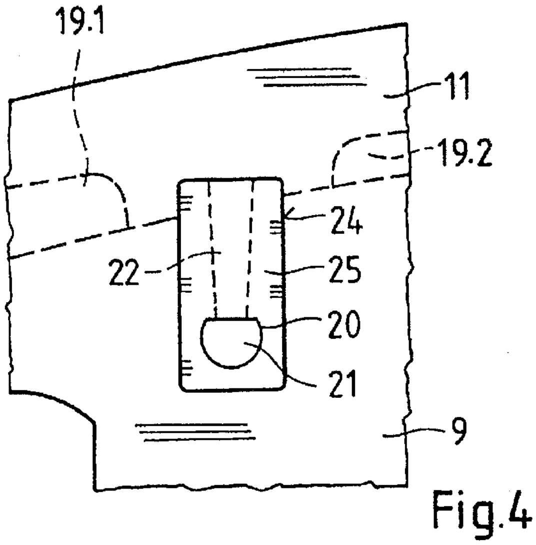
FIG. 4 is an enlarged view of a rectangular insert part in a guide bar.
Figure 5:
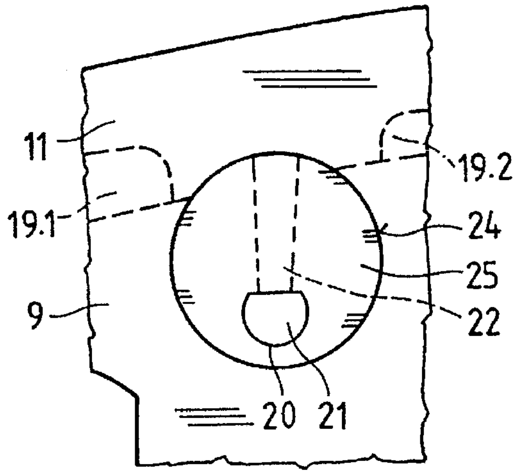
FIG. 5 is an enlarged detail view of a disc-shaped insert part in a guide bar.
Figure 6:
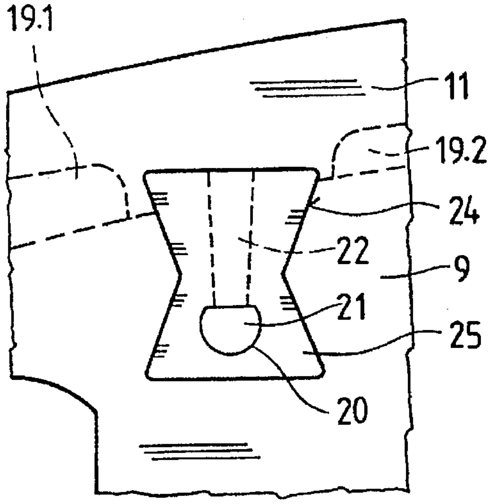
FIG. 6 is an enlarged detail view of a rectangular insert part having a constricted region and mounted in a guide bar.

The basic form of the insert part 25 comprises a parallelopiped-shaped base body such as shown in FIG. 4. Such a parallelopiped-shaped base body having rectangular flat sides can have a constriction at half length as shown in FIG. 6. Preferably, the base body has rounded narrow ends in the peripheral direction (FIG. 2). Preferably, the narrow ends are formed as semicircles. In a further embodiment of FIG. 5, the insert part 25 can have the form of a circular disc.

Figure 8:
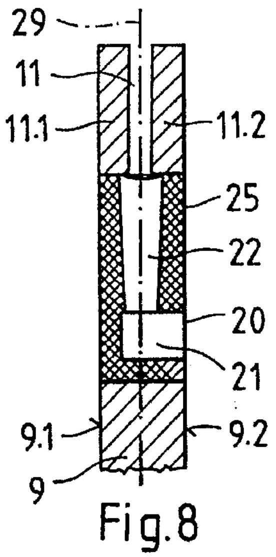
FIG. 8 is a section view taken along line VIII—VIII of FIG. 7.
Figure 7:
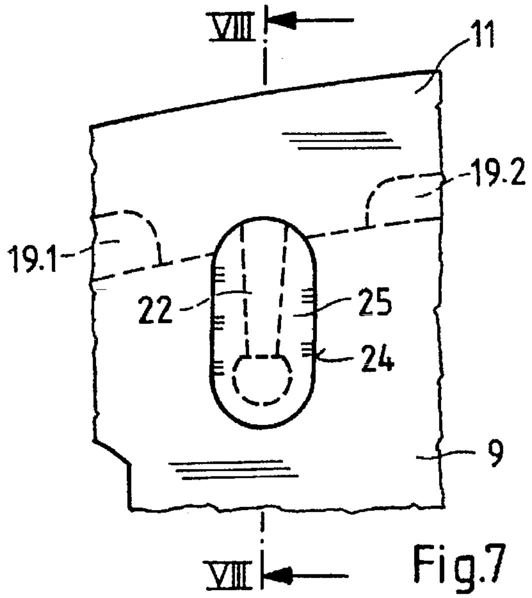
FIG. 7 is an enlarged detail view of a rectangularly-shaped insert part having semicircularly-shaped rounded narrow ends and a transverse channel having an opening only to one side of the base body.

In the embodiment of FIGS. 7 and 8, the transverse channel 21 is configured as a blind channel starting from one outer side 9.2 of the guide bar 9. The oil-feed channel 22 branches off from the transverse channel 21 to the guide groove 11. It is noted that the insert part 25 is otherwise configured in correspondence to the embodiment of FIGS. 2 and 3.

In the embodiment of FIGS. 9 and 10, the cutout 24 is formed as a spotfaced recess having a depth (t) greater than the half thickness D but less than the thickness D of the guide bar 9. The recess 24 formed as a spotfaced recess is machined, preferably by milling, from the outer side 9.2 of the guide bar 9. On the side which faces toward the recess, the insert part 25 has a peripheral edge 26 which is open toward the guide groove 11. The peripheral edge 26 delimits the oil-feed channel 22. This channel is formed between the insert part 25 and the base 27 of the recess 24. The transverse channel 21 is formed in the insert part 25. In this way, an oil-inlet opening 20 provided on the insert part 25 is present only on the outer side 9.2.

In the embodiment of FIG. 10*a*, an oil-inlet opening 20 is provided on both outer sides 9.1 and 9.2 of the guide bar 9. The insert part 25 is configured identically to the embodiment of FIG. 10. The transverse channel 21 comprises a first segment 21.1 formed in the insert part 25 and a second segment 21.2 configured to be on the same axis as the segment 21.1. The segment 21.2 is formed in the base body 16 of the guide bar 9. It can be purposeful to configure the diameter of the segment 21.2 of the transverse channel 21 to be slightly greater than the diameter of the segment 21.1 in the insert part 25. The segment 21.2 is formed in the guide bar 9.

In the embodiment of FIGS. 11 and 12, the insert part 25 is configured as a closure plate of a spotfaced recess introduced from the outer side 9.2. The depth of the cutout 24 corresponds approximately to the flange width (b) of a guide flange 11.2 of the guide groove 11. Otherwise, the configuration corresponds to the embodiment of FIG. 10*a*.

Figure 14:
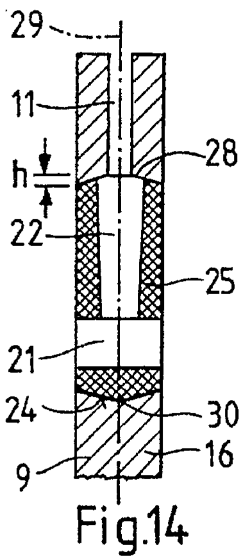
FIG. 14 is a section view taken along line XIV—XIV of FIG. 13.
Figure 13:
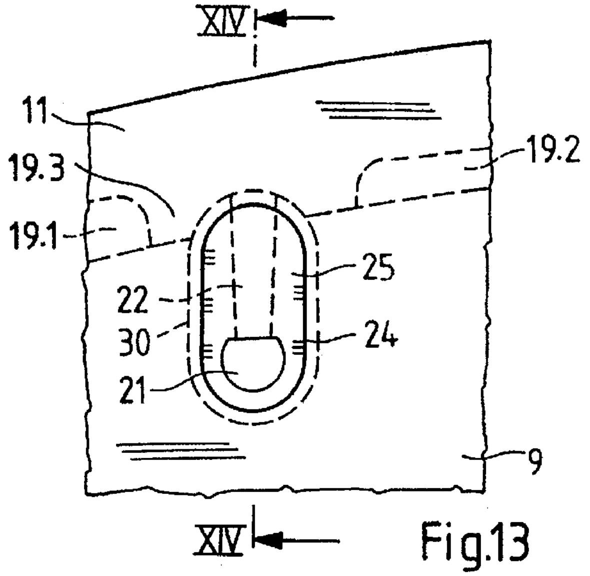
FIG. 13 is an enlarged detail view of an insert part pressed into an undercut cutout.

The embodiment of FIGS. 13 and 14 corresponds with respect to its basic configuration to the embodiment shown in FIGS. 2 and 3. The embodiment of FIGS. 13 and 14 departs from that shown in FIGS. 2 and 3 in that the cutout 24, which is configured as a breakthrough, is provided with an undercut 28 having a depth (h). The undercut preferably extends peripherally and lies approximately symmetrically to the longitudinal center plane 29 of the base body 16 of the guide bar 9. The insert part 25, which is configured in correspondence to the cutout, engages with its increased peripheral edge 30 in the undercut 28 whereby the insert part 25 is held form-locked in the base body 16 perpendicularly to the plane of the guide bar 9.

Figure 16:
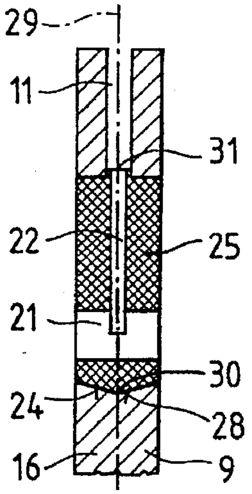
FIG. 16 is a section view taken along line XVI—XVI of FIG. 15.
Figure 15:
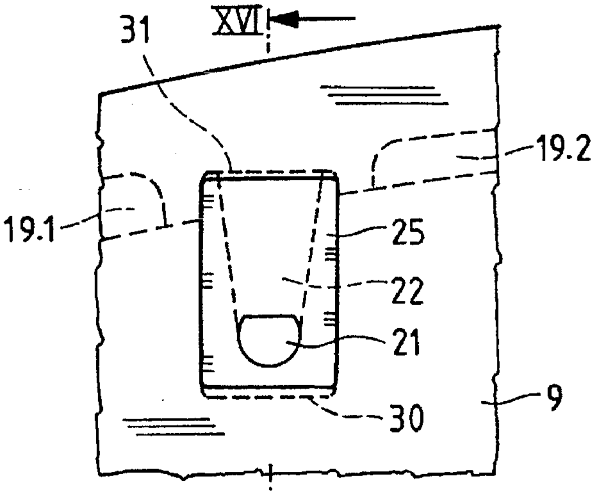
FIG. 15 is an insert part having an undercut and a head extension projecting into the guide groove.

It can be purposeful to arrange the undercut only on mutually opposite sides of the rectangularly-shaped base body of the insert part 25 as shown in FIGS. 15 and 16. The insert part includes a head extension 31 at its end facing toward the guide groove 11. The head extension 31 preferably engages force-tight between the side flanges (11.1, 11.2) of the guide groove 11. A raised edge 30 is provided on the end lying opposite to the head extension 31 and corresponds to that shown in the embodiment of FIGS. 13 and 14. The raised edge 30 engages in an undercut 28 machined into the side surface of the cutout 24. The undercut 28 is symmetrical to the longitudinal center plane 29 of the base body 16 of the guide bar 9.

Figure 18:
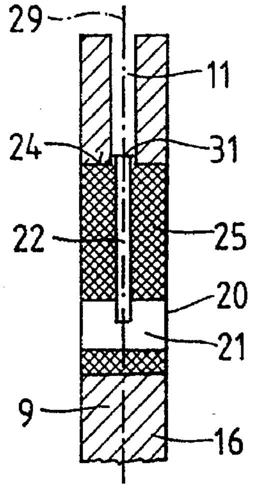
FIG. 18 is a section view taken along line XVIII—XVIII of FIG. 17.
Figure 17:
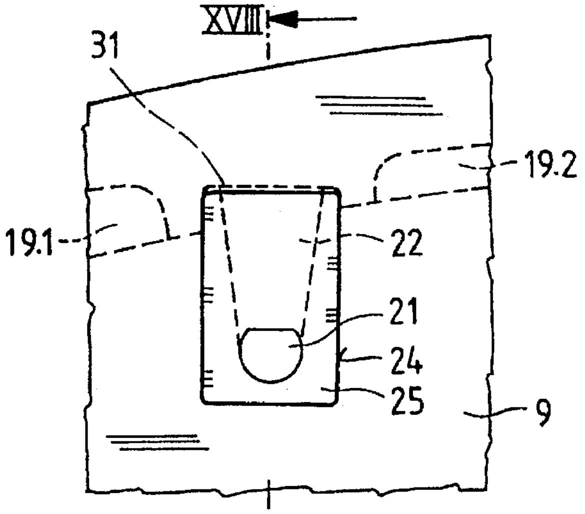
FIG. 17 is a rectangularly-shaped insert part having a head extension engaging in the guide groove.

In the embodiment of FIGS. 17 and 18, a head extension 31 is provided exclusively on the end of the insert part 25 facing toward the guide groove 11. The head extension 31 engages force-tight between the side flanges (11.1, 11.2) of the guide groove 11. The arrangement of such a head extension 31 ensures already that the insert part 25 will be securely held even when the insert part is not configured so as to have an oversize or when the insert part 25 shrinks because of deterioration of the plastic, silicone mixture or rubber.

Figure 20:
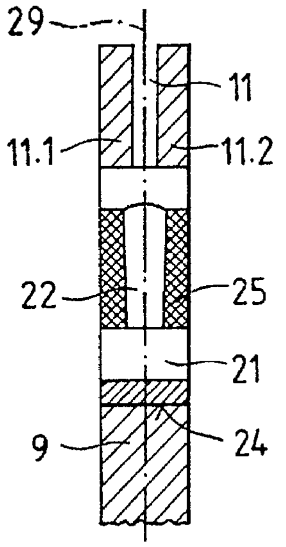
FIG. 20 is a section view taken along line XX—XX of FIG. 19.
Figure 19:
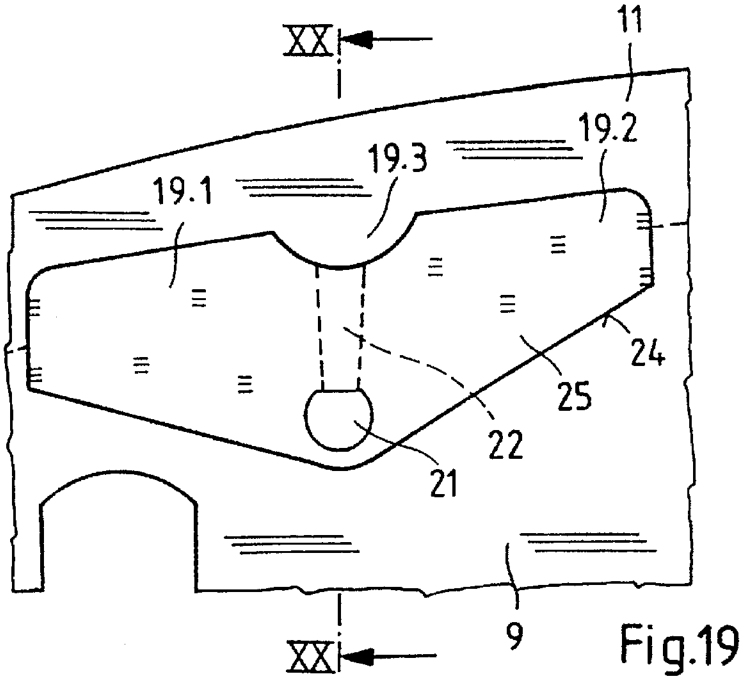
FIG. 19 is an enlarged detail view of an insert part configured as one piece with fill bodies mounted in the guide groove.

In the embodiment of FIGS. 19 and 20, the insert part 25 is configured essentially as in the embodiment of FIGS. 2 and 3 and is one piece with the fill bodies (19.1, 19.2). A retaining space 19.3 is provided between the fill bodies and is configured as a depression between the fill bodies. The thickness of the fill bodies (19.1, 19.2) corresponds preferably to the thickness of the insert part 25.

Figure 22:
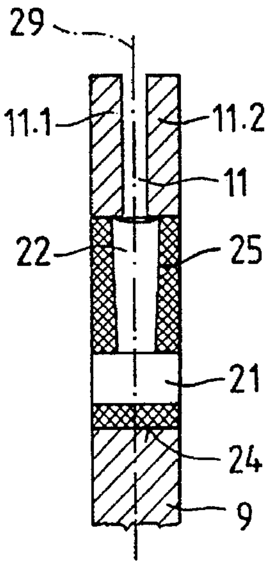
FIG. 22 is a section view taken along line XXII—XXII of FIG. 21.
Figure 21:
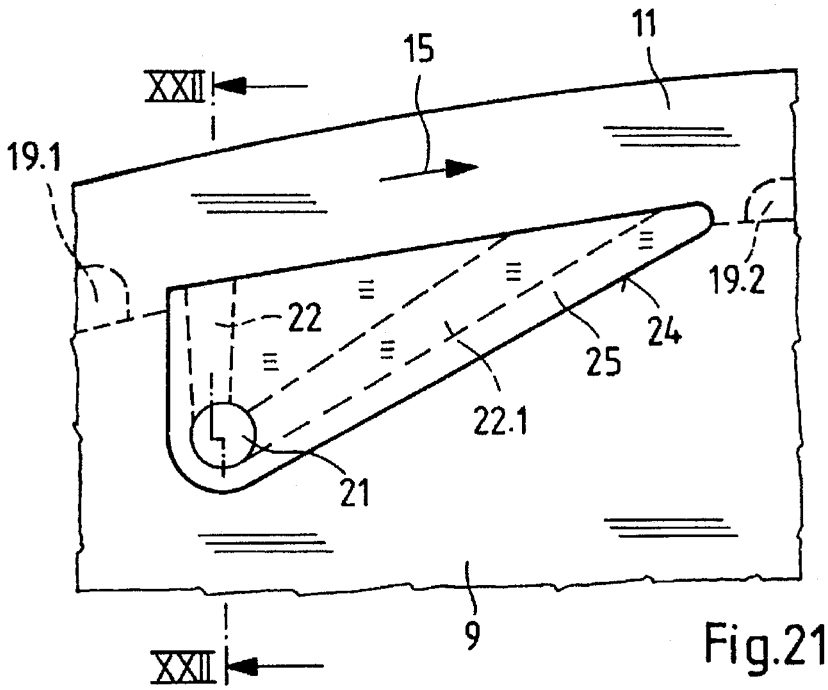
FIG. 21 is an enlarged detail view of an insert part having two oil-feed channels.

In the embodiment of FIGS. 21 and 22, the insert part 25 extends over a longitudinal segment of the guide groove 11. The insert part has an oil-feed channel 22.1 which lies inclined to the running direction 15 of the saw chain. A further oil-feed channel 22 is arranged next to the oil-feed channel 22.1. The oil-feed channel 22 opens into the guide groove 11 essentially at right angles. In the embodiment of FIGS. 21 and 22, the insert part 25 has approximately the form of a right triangle having different side lengths.

Figure 24:
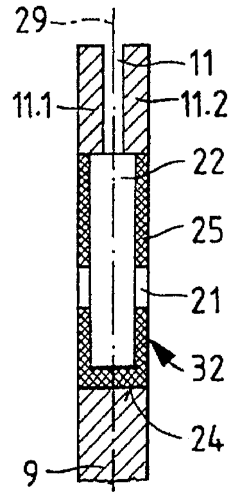
FIG. 24 is a section view taken along line XXIV—XXIV of FIG. 23.
Figure 23:
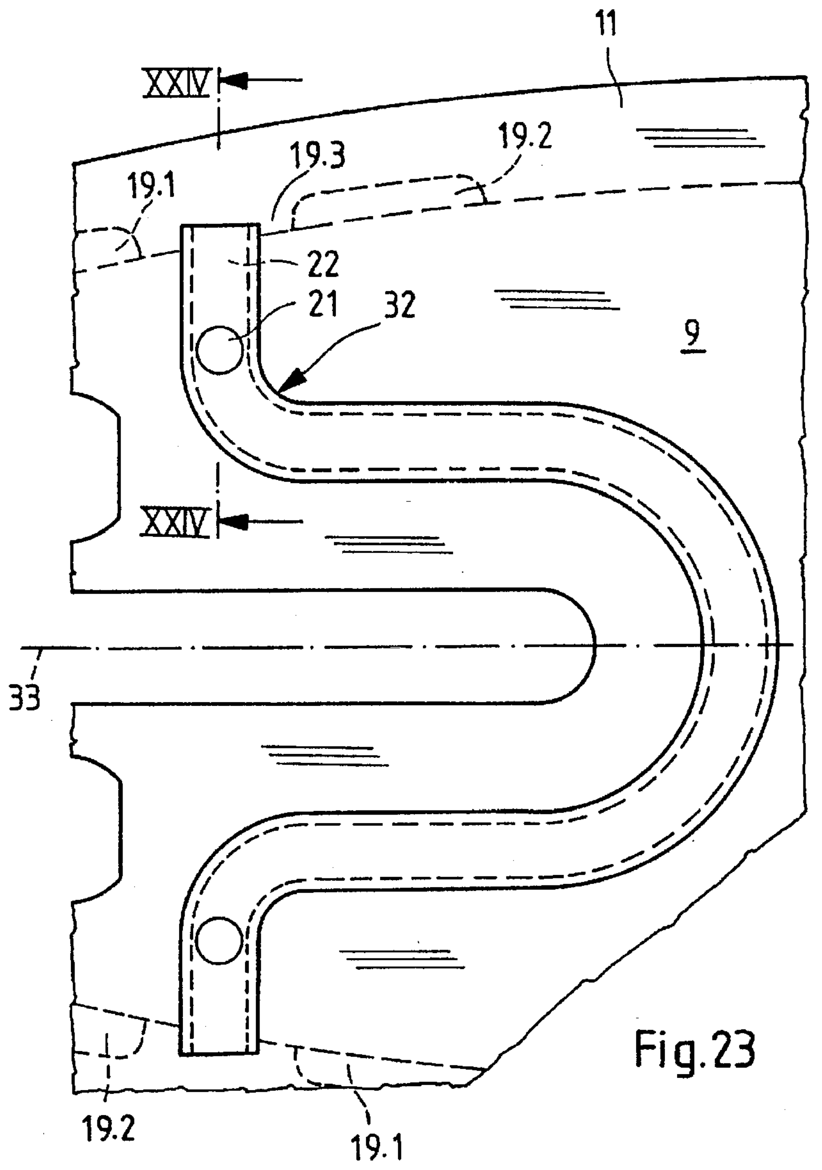
FIG. 23 is a detail view of an insert part configured as an enclosure defining a hollow profile and being mounted in a guide bar.

The embodiment of FIGS. 23 and 24 shows an insert part 25 configured as a box-like hollow profile 32. This hollow profile 32 opens into the guide groove 11 of the guide bar 9 at the opposite ends. The hollow profile 32 is configured to have essentially a U-shape. The U-shape lies symmetrically to the longitudinal center axis 33 of the guide bar 9. The free legs of the U-shaped profile 32 are bent in the direction toward the guide groove 11 and open between the fill bodies (19.1, 19.2) in the guide groove 11.

Figure 26:
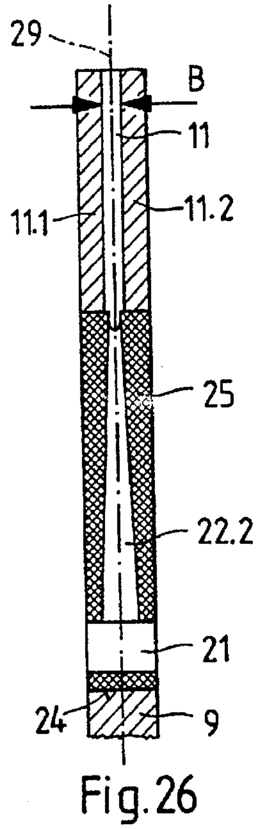
FIG. 26 is a section view taken along line XXVI—XXVI of FIG. 25.
Figure 25:
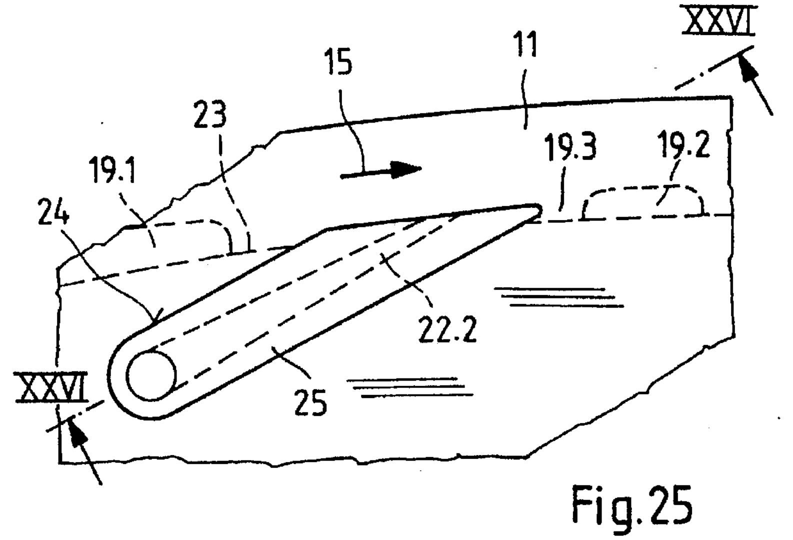
FIG. 25 is an enlarged detail view of an insert part inclined in the running direction of the saw chain and having a tapered oil-feed channel.

In the embodiment of FIGS. 25 and 26, the insert part itself is inclined in the running direction 15 of the saw chain. Preferably, the insert part has a longitudinally-extended oil-feed channel 22.2 which is tapered and especially conically tapered. The opening of the oil-feed channel 22.2 is above the groove bottom 23 and has a diameter less than the width B of the guide groove 11. Because of the arrangement in the insert part 25, the transverse channel and the oil-feed channel can be configured with different cross sections which are adapted to the particular operating conditions.

Preferably, the oil-feed channel 22.2 is configured to have a diameter greater than the width B of the guide groove 11 as shown in FIGS. 2 to 8.

Figure 27:
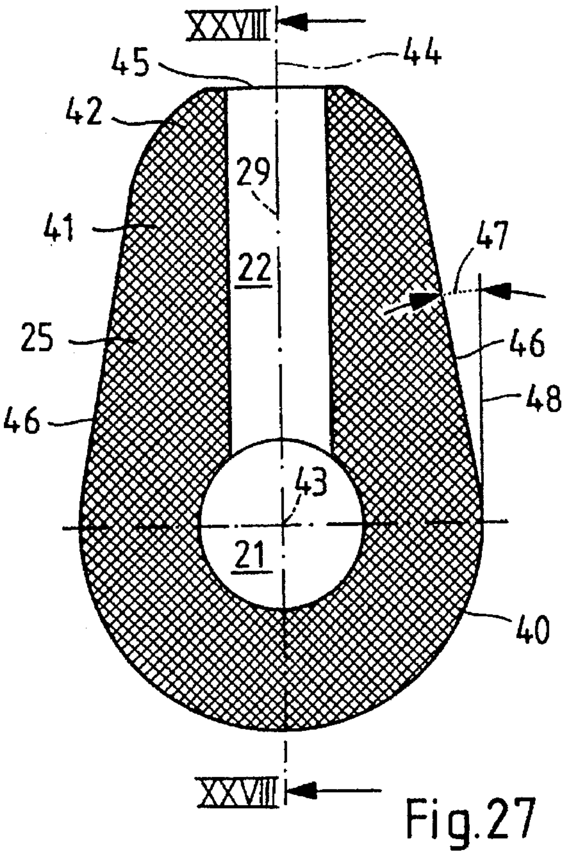
FIG. 27 is a section view taken through a further insert part having a transverse channel and an oil-feed channel; and, FIG. 28 is a section view taken along line XXVIII—XXVIII of FIG. 27.
Figure 28:
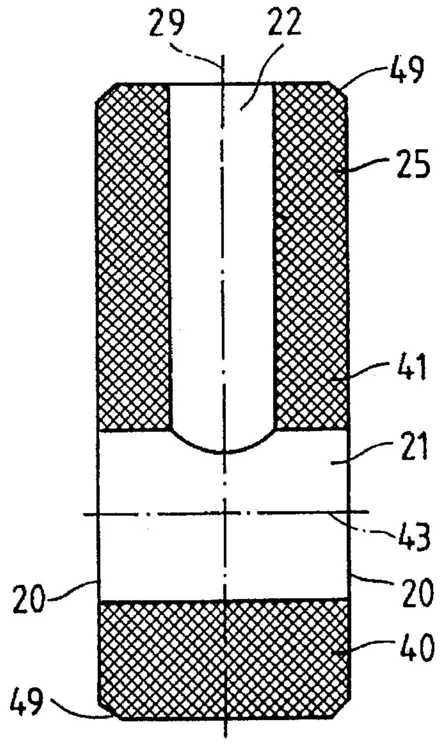

In the embodiment of FIGS. 27 and 28, the base body of the insert part 25 has essentially a rectangular shape. The insert part 25 comprises a half-cylindrical foot portion 40 and a head extension 41 extending on the flat side. The head extension 41 is tapered toward its free end 42. The longitudinal center axis 43 of the transverse channel 21 is coincident to the circular center point of the foot portion 40. The longitudinal center axis 29 of the oil-feed channel 22 lies at right angles to the longitudinal center axis 43. The longitudinal center axis 29 also lies in the symmetry plane 44 of the insert part 25. The narrow sides of the insert part 25 are configured so as to be rounded in the peripheral direction. The opening 45 of the oil-feed channel 22 lies in a plane on which the longitudinal center axis 29 is preferably perpendicular. The longitudinal sides 46 of the insert part 25 lie at an angle 47 to the tangent 48 at the foot portion 40. The peripherally extending peripheral edge 49 of the insert part 25 is beveled. The transverse channel 21 and the oil-feed channel 22 are configured to be cylindrical. The diameter of the transverse channel 21 is greater than the diameter of the oil-feed channel.

It is understood that the foregoing description is that of the preferred embodiments of the invention and that various changes and modifications may be made thereto without departing from the spirit and scope of the invention as defined in the appended claims.

What is claimed is:

1. A guide bar for guiding a saw chain, the guide bar comprising:

a sword-shaped base body having a peripheral edge defining a peripherally-extending guide groove for guiding the saw chain in its movement around the guide bar;

said guide groove having a groove bottom;

said base body having a first lateral side and a second lateral side and a cutout formed therein;

said cutout being formed in said base body so as to be open at least at one of said lateral sides and so as to extend essentially below said groove bottom;

an insert part separate from said base body seated in said cutout;

said insert part having a transverse channel formed therein through which oil is supplied and said transverse channel being disposed below said groove bottom; and, said insert part delimiting an oil-feed channel extending from said transverse channel and opening into said guide groove in the region of said groove bottom whereby said oil passes from said transverse channel to said guide groove through said oil-feed channel.

2. The guide bar of claim 1, said cutout being an open breakthrough extending from said first lateral side to said second lateral side.

3. The guide bar of claim 2, said cutout being a spotfaced recess formed in one of said first side and said second side; and, said insert part being configured as a closure plate of said spotfaced recess.

4. The guide bar of claim 3, said cutout being open to said groove bottom and said oil-feed channel being formed in said insert part.

5. The guide bar of claim 4, said guide groove having a width (B) and said oil-feed channel having a diameter greater than said width (B).

6. The guide bar of claim 5, said oil-feed channel defining a flow direction from said transverse channel to said groove bottom and widening conically in said flow direction to said groove bottom.

7. The guide bar of claim 5, said oil-feed channel having an opening formed in said groove bottom and said oil-feed channel having a taper toward said opening.

8. The guide bar of claim 5, said saw chain moving in a pregiven running direction in said guide groove; and, said oil-feed channel being inclined to said running direction.

9. The guide bar of claim 1, said transverse channel being formed by a first channel segment and a second channel segment, the first one of said channel segments being formed in said insert part and the second one of said channel segments being formed in said base body.

10. The guide bar of claim 1, said transverse channel being open to both said lateral sides of said base body.

11. The guide bar of claim 1, said cutout being formed to have an undercut formed in at least one lateral surface thereof.

12. The guide bar of claim 1, said insert part having a slight oversize relative to said cutout.

13. The guide bar of claim 1, said base body having mutually adjacent guide flanges on said peripheral edge thereof to define said guide groove; and, said insert part having a head extension engaging between said guide flanges.

14. The guide bar of claim 1, said insert part defining mutually adjacent fill bodies integral therewith and extending into said guide groove.

15. The guide bar of claim 1, said insert part having at least one additional oil-feed channel formed therein opening into said guide groove.

16. The guide bar of claim 1, said insert part being defined by a body having essentially a parallelopiped shape with narrow rounded peripheral sides.

17. The guide bar of claim 1, said insert part being defined by a body having a semi-cylindrical foot portion and a head portion extending upwardly from said foot portion; and, said head portion having a free end and being tapered to said free end.

18. The guide bar of claim 1, said insert part being a disc.

19. The guide bar of claim 1, said insert part having a predetermined length and having a shape corresponding to a parallelopiped and being constricted laterally at approximately half of said length.

* * * * *